United States Patent

[11] 3,615,258

[72] Inventor John P. Glass
 c/o Cava Industries, 79 La Grange Ave., Essington, Pa. 19029
[21] Appl. No. 769,477
[22] Filed Oct. 17, 1968
[23] Division of Ser. No. 480,918, Aug. 19, 1965
[45] Patented Oct. 26, 1971

[54] MAKING FIBERS FROM ELECTROSTATICALLY CHARGED VAPOR
 10 Claims, 3 Drawing Figs.
[52] U.S. Cl. .................................................. 23/294,
 117/93.4, 204/181, 156/150, 23/301, 264/24, 65/5
[51] Int. Cl. .......................................................... B01d 7/00
[50] Field of Search ............................................ 23/273,
 294, 301, 209.11; 264/24; 156/150; 117/93.4, 41,
 42, 47, 44; 204/181; 35/19; 300/1; 148/1.6;
 65/2.5; 57/157

[56] References Cited
UNITED STATES PATENTS

| | | | |
|---|---|---|---|
| 2,048,651 | 7/1936 | Norton | 23/294 |
| 2,385,873 | 10/1945 | Melton | 23/294 |
| 2,338,570 | 1/1944 | Childs | 204/181 |
| 2,836,524 | 5/1958 | Brenner et al. | 148/1.6 |
| 3,060,013 | 10/1962 | Harvey et al. | 148/1.6 |

Primary Examiner—Norman Yudkoff
Attorney—John F. A. Earley

ABSTRACT: Method of making fibers by crystallization from vapor comprising creating a vapor of fiber-producing material, forming a plurality of growing elongated fibers by condensing fibrous crystals from the vapor in a growing zone, constraining the fibers into s strand, dispersing and separating the ends of the fibers by applying an electrostatic charge thereto so that the ends are separated and individually exposed to vapor, measuring the rate of growth of the fibers by measuring the capacitance to ground of the fibers, and withdrawing the fibers from the growing zone in accordance with the rate of fiber growth.

INVENTOR
JOHN P. GLASS

3,615,258

MAKING FIBERS FROM ELECTROSTATICALLY CHARGED VAPOR

CROSS-REFERENCE TO RELATED APPLICATIONS

This Pat. application is a division of my Pat. application Ser. No. 480,918 filed Aug. 19, 1965.

BACKGROUND OF THE INVENTION

This invention relates to a method and apparatus for making fibers, and more particularly concerns a method and apparatus for making fibers by condensation of material from a vapor phase.

It has long been known that the strength of crystal structures without stress-concentrating faults, dislocations notches, etc., is astonishingly high, being of the order of 10 times the normal gross strength that is usually observed in the same material, and it has been known that in order to develop this high strength it is necessary to form the crystalline material into long, needlelike linear crystals, technically called "whiskers." It has not previously been possible to produce these whiskers except in quite limited length, primarily because the necessary conditions for growth at their ends have not been maintained without interruption over a sufficient time or volume. Also, it has not previously been possible to produce whiskers with any great deal of consistency, because so many things in this field are unknown.

There are also certain processes which take place which tend to terminate the growth at the ends. It has previously not been possible to produce, from vapor in a continuous process, a slender, long fiber having a crystalline structure which is substantially free from defects so that the fiber exhibits a strength near its very high theoretical strength. Much work is being done today to increase the strength and length of fibers made of graphite, aluminum oxide and the like. Until now, unusual strengths of these materials have been available only in laboratory quantities.

SUMMARY OF THE INVENTION

It is an object of this invention to provide an improved method and apparatus for making these fibers. It is also an object of this invention to provide a method and apparatus for making the fibers in long lengths and large quantities economically.

It is another object of this invention to provide such method and apparatus which are adapted to withdraw the growing fibers from the zone where they are condensed in accordance with the rate of growth of the fibers, or to control the rate of growth of the fibers to correspond to the rate at which they are being withdrawn.

BRIEF DESCRIPTION OF THE DRAWINGS

Other objects and advantages of this invention, including its simplicity and economy, as well as the ease with which it may be adapted to existing equipment, will further become apparent hereinafter and in the drawings, in which.

Figure 1:
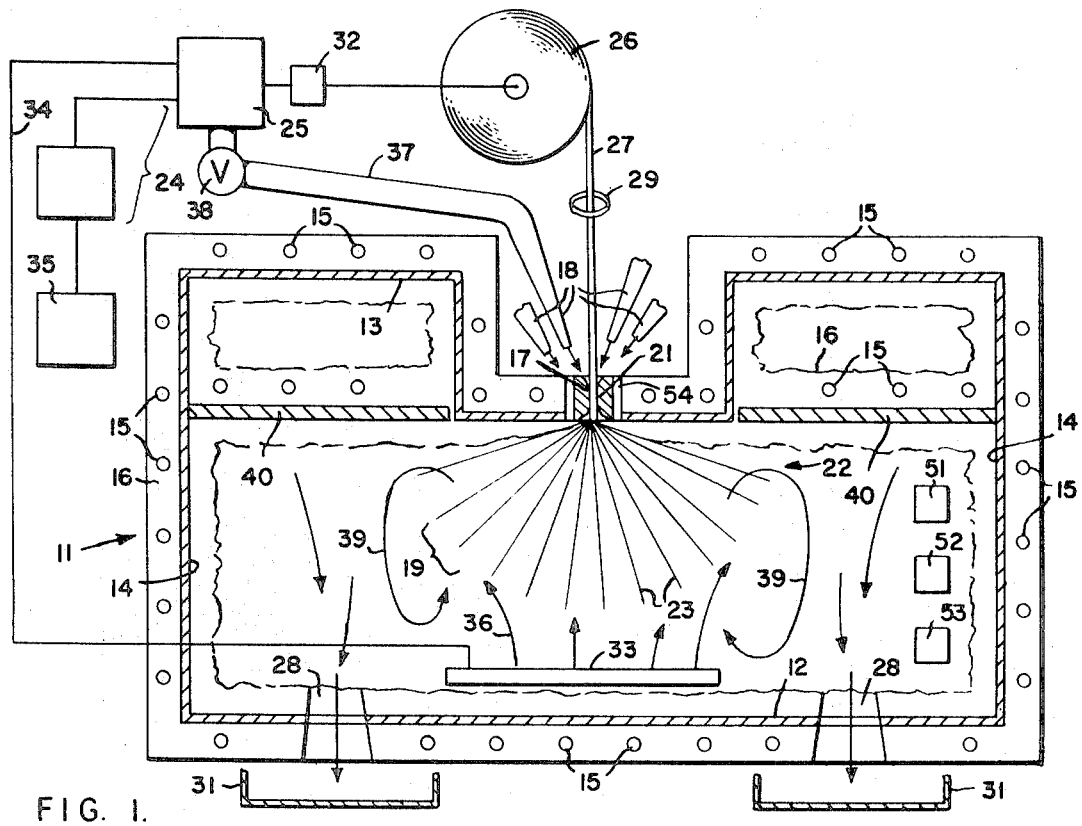
FIG. 1 is a schematic view of apparatus for making fibers constructed in accordance with this invention.

Although specific terms are used in the following description for clarity, these terms are intended to refer only to the structure shown in the drawings, and are not intended to define or limit the scope of the invention.

DESCRIPTION OF THE PREFERRED EMBODIMENTS

Turning now to the specific embodiments of the invention selected for illustration in the drawings, Fig. 1 shows a chamber 11 having heated walls 12–14 on all sides, said walls being heated by such materials as molybdenum heating elements 15 in order to secure high temperatures. The heating elements 15 are protected from oxidation by any of the usual means including the use of an inactive gas envelope shielding the heating elements from the atmosphere. The temperatures of the walls are not necessarily held at uniform temperature, it being desirable that the heating element near the point of introduction of the material to be vaporized, or near the material in vapor form, be the hotter part of the chamber and that the great bulk of the chamber be held at a temperature to maintain the vapor in an unsaturated condition. At a selected point of points in the walls, preferably in the top wall 13, a cold spot 17 is produced by any of the usual means of cooling locally this spot, such as directing against it a current 18 of relatively cooler gas. Concentrically in this cold spot, an orifice 21 permits a bundle 22 of nucleating fibers 23 to be withdrawn from the chamber 11 as the ends of the fibers grow.

An electrostatic charge is applied to the growing fibers 23, and an electrical circuit 24 provides means for measuring the value of the electrostatic capacitance of the fibers to ground. This value controls the operation of a servomotor 25 in circuit 24 which operates a reel 26 for withdrawing the fibers 23 in the form of a strand 27 from chamber 11. Instead of operating the reel 26, the servomotor may operate a servo valve 38 which controls the rate of formation of the fibers. In some circumstances, the servomotor 25 may be eliminated when the rate of fiber withdrawal has been regulated to coincide with the rate of fiber formation.

The electrostatic charge on the fibers 23 fan out the ends of the fibers so that the ends are separated and individually exposed to the vapor to promote the growth of the individual fibers.

In addition, it is surmised that the high-potential gradients at the ends of the fibers promote their growth. In the case of growth of graphite whiskers there is no problem with electrical conduction along the axis of the fibers 23 to maintain the charge on the ends of the fibers. Even in normally nonconducting materials such as aluminum oxide, which is an excellent insulator at even quite high temperatures, it is well known that when the temperature is raised sufficiently thermal agitation gives sufficient energy to the electronic structure of the material so that there is sufficient energy for the electrons to cross the forbidden zone representing nonconduction, and at the temperatures at which chamber 11 and this apparatus operate there is little problem in maintaining a charge on the ends of even aluminum oxide fibers.

It is further surmised that the dislocation in the screw growth mode aids in nucleation. In the present process, a stable growing zone 19 is set up by the current 18 of cool gas as it passes through orifice 21 into chamber 11. Zone 19 defines a limiting terminus for the fibers 23, and they cannot grow beyond this zone because the higher temperatures in the chamber at large would reverse the reaction and cause the fibers to evaporate or vaporize. However, it is possible to pull the fibers too rapidly up into the shielding mantle 19 of relatively cool gas and thereby terminate the process. To prevent this occurrence the capacitance of the electrostatically dispersed fibers 23 is measured continuously by superimposing a small alternating current charge and measuring the capacitance of the dispersed bundle 22 of fibers 23 to ground by any of the well-known electronic methods, and controlling some phase of the reaction to insure the proper growth rate. In the case of graphite, in which the fibers are conducting at a low temperature, it is desirable to separate the capacitance of the reel 26 from the capacitance of the fibers 23 that I wish to measure. Accordingly I introduce reluctance, iron rings 29, between zone 19 and the reels.

Thus if the fibers become withdrawn through the cold region so that they cease to grow due to the lack of condensing vapor, the capacitance of fibers 23 fails and the introduction of cold vapor through conduit 37, for example, is reduced by servo-actuated means such as valve 38. Likewise the control may be the reduction of the influent vapor material to vaporizer 33 or through conduit 37 as the capacitance of the growing cluster becomes too large and/or the rate of withdrawal may be changed by controlling the speed of the reel. Any other parameter controlling the rate of growth such as the introduction of one of the growth-promoting phases of an active element may be controlled. Any or all such controls may be in turn controlled by measurements of the capacitance of the growing cluster of fibers. Further, if all ingredients are properly adjusted, the inherent stability of zone 19 makes possible the elimination of servocontrol of this inherently stable process.

In order to prevent the walls, or any portion of the oven chamber 11, from becoming a nuisance by reason of wild nucleation in undesired regions, the oven walls 12–14 may be either maintained at a sufficiently high temperature to prevent whiskers forming, or they may be made semipermeable and the inactive gas shielding the heating elements may be allowed to seep through the walls establishing a zone poor in vapor phase adjacent to the walls. By reason of both this diffusion process and by reason of the introduction of carrier gases and cooling gases around the stem or strand 27 of the growing cluster or bundle 22, exists 28 are provided for the spent or used gas and vapor mixtures. Inasmuch as immediately upon exiting from the chamber, the loss of heat causes supersaturation and crystallization, it is desirable that these exits be at the bottom of the chamber 11 and sufficiently heated at their orifices so that no extraneous nucleating takes place within the chamber 11. Moreover, by controlling the temperature gradients as the gas is cooled exiting from the bottom wall 12 of the chamber 11, the condensate may be made in the form of short fibers or whiskers and these collected by suitable separate collecting means 31 below the main chamber 11.

Servomotor 25 is also connected to vaporizer 33 by electrical conductors 34 which provide means for controlling the rate of creating vapor in chamber 11.

Electronic bridge 35 in electrical circuit 24 provides means for measuring the rate of growth of fibers 23 by measuring the growth of the capacitance of the charged fibers to the rest of the chamber 11.

Orifice 21 includes edges which are streamlined, nonsticking and relatively cool.

In one form of operation, vaporizer 33 produces a vapor stage of fiber-producing materials in chamber 11. A plurality of growing elongated fibers 23 are formed by condensing fibrous crystals from the vapor. The rate of growth of the fibers 23 is measured by applying an electric potential to the growing fibers 23 and measuring the rate of growth of the electric capacitance. The fibers 23 are withdrawn from chamber 11 by the reel 26 which is operated by servomotor 25 at a speed which responds to the value of the electric capacitance of the fibers 23, the unbalance in capacitance being detected by the electronic bridge 35 which actuates servomotor 25.

The electrostatic charging of fibers 23 fans out the ends of the fibers so that the ends are separated and individually exposed to vapor.

Fibers 23 are gathered together at a constricting position defined by orifice 21 which is spaced away from the fiber ends.

In one form of the apparatus, the vapor emitted from vaporizer 33 is hot and rises as indicated by the arrows 36 toward growing zone 19. Also, the electrostatic charge on fibers 23 may be negative, and a positive charge may be impressed upon the hot vapor as it leaves the vaporizer 33. Accordingly, the vapor is propelled from vaporizer 33 toward drawing zone 19 by the hot temperature of the vapor and also by the electrical charge which is attracted to the opposite electrical charge of the fibers 23. The negative and positive charges may be impressed on fibers 23 and vaporizer 33 by a source 47 of high potential.

The excess vapor is forced downwardly by pressure and escapes through the exit ports 28 in bottom wall 12.

A shield 40 is provided in chamber 11 below ceiling wall 13 and is physically separated from the depressed portion of wall 13. The separation is as small as possible in order to prevent unwanted escape of the gas within the lower portion of chamber 11. The physical separation prevents electrical conduction between the lower portion of ceiling wall 13 and shield 40. The shields 40 help prevent nucleation in the zone above the shields, and help confine the growth of the fibers to the nucleating zone defined by zone 19.

The introducing of cool gas through orifice 21, or adjacent thereto, into zone 19 increases the rate of growth of the whiskers. By introducing a cooling gas into zone 19, growth of the whiskers along their stems or root is prevented and the growth of the whiskers is confined to the ends. Also the electrostatic potential introduced for separating purposes promotes fiber growth at the ends. Accordingly, the radially inward flow of heat is counteracted by the radially outward flow of a cooling gas so that nucleation of the roots of the fibers within zone 19 is prevented. Where the cooling gas contains a hydrocarbon for the production of carbon whiskers, the temperature near orifice 21 is too low so that there is a scarcity of carbon near orifice 21 and the heat near the fiber ends causes the hydrocarbons to crack and deposit carbon on the radiantly heated ends of the whiskers.

When a cold gas flows radially outwardly from orifice 21 along the whiskers 23 which are heated by the radiant energy within chamber 11, a stable nucleating zone 19 is formed so that servoing is not required.

The operation and rate of growth of the whiskers are controlled preferably in response to the cooling rate of the gas directed toward orifice 21, or in response to the rate of vaporization within chamber 11, rather than in response to the rate of withdrawal of the fibers by reel 26.

The electrostatic charge on the whiskers within zone 19 may be utilized to aid the growth of the whiskers by making the electrostatic charge opposite to a charge placed on the hot gas ions so that the gas ions are attracted to zone 19. For example, placing a negative electrostatic charge on whiskers or fibers 23 sets up gross currents in a uniform space, thereby attracting the hot gas from vaporizer 33 towards fibers 23. Further, the very high electrical gradients at the ends of the fibers promote growth.

The apparatus of the present invention is adapted to produce many types of crystals, including silica, aluminum oxide, carbon, and so forth.

The apparatus of the present invention is adapted for making fibers by nucleation from a vapor phase wherein a bundle of nucleating fibers 23 is constrained and passed from chamber 11 through orifice 21, with the nucleating ends of the fibers 23 being dispersed and held apart by electrostatic forces. A relatively cooler passive gas is introduced approximately concentric to orifice 21 through which fibers 23 exit, and the gas flows approximately radially outwardly from orifice 21 and forms a buffer zone which is both low in temperature and low in saturation of the condensing vapor, whereby a more or less hemispherical zone of supersaturation is maintained in a chamber of vapor dispersed in an inactive gas which is held above temperatures required for saturation.

In one form, the apparatus for making fibers comprises a heated chamber 11 containing a desired condensate material in an under-saturated vapor phase dispersed in an inactive gas, an orifice 21 leading from chamber 11, a bundle of nucleating fibers 23 being withdrawn through the orifice 21 and having nucleating ends dispersed and held fanned-out by electrostatic force, and an approximately hemispherical supersaturation zone 19 at the ends being maintained by a flow of relatively cooler gas flowing radially from sources nearly adjacent to the fiber withdrawal orifice 21.

If desired, the cooling gas introduced adjacent to the fiber withdrawal orifice 21 may contain an active element which promotes the reaction in the approximately hemispherical growth zone 19 at the ends of the nucleating fibers.

In another form of the invention, the principal active element is a hydrocarbon with a buffer material such as hydrogen or nitrogen introduced near orifice 21 and flowing radially outward along the fibers until the fibers heated from outside the cluster are not enough to cause the hydrocarbon to crack, the carbon depositing on the ends of the fibers and the hydrogen proceeding into the heated chamber. Means for promoting dendritic growth from the ends of the nucleating fibers may be introduced into chamber 11. Such means may comprise a sound shock wave caused by an electrical discharge from an electrical discharge element 51 located somewhere within chamber 11. The dendritic growth promoter may be the application of a vibration to chamber 11 from vibrator 52, or it may be the introduction of suitable growth-promoting materials, such as a small amount of contaminant material from emitter 53.

Figure 2:
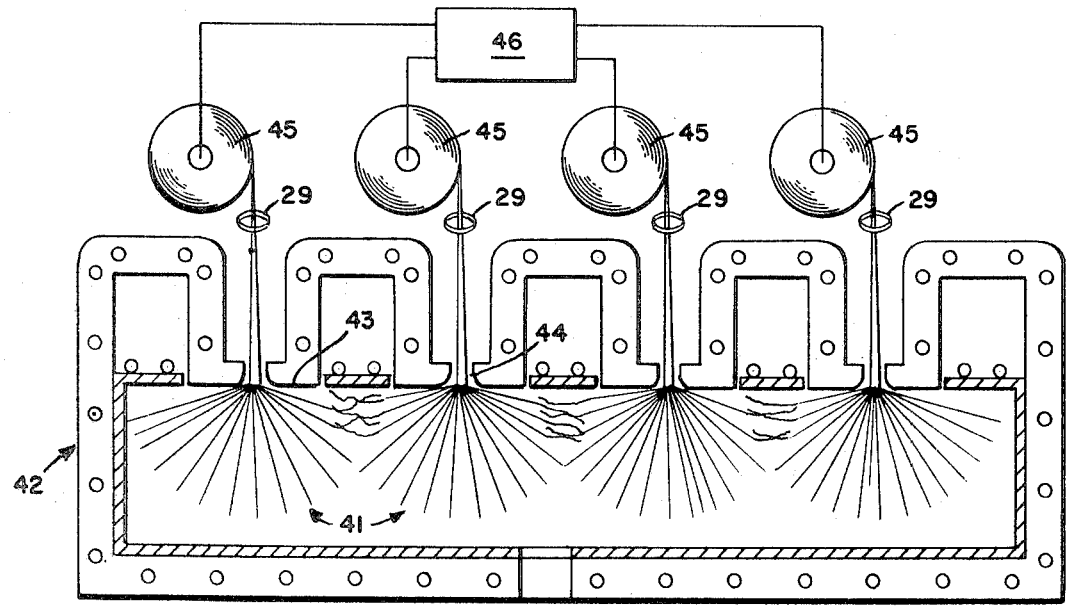
FIG. 2 is a partial view in vertical section of another embodiment of the invention.

In Fig. 2, a plurality of electrostatically charged groups 41 of fibers are shown in a chamber 42 having a ceiling wall 43. The groups 41 are withdrawn through ceiling wall 43 through a plurality of exit openings 44 and are pulled therethrough by a plurality of reels 45 which are operated by a servomotor control 46. The inverted umbrella shape of the ends of the groups 41 of fibers is distorted somewhat by adjacent groups. The ends of the groups 41 of fibers form a guard ceiling that protects ceiling wall 43 of chamber 42 against the forming of unwanted fibers thereon.

In another form of operation, the material to be crystallized may be introduced into chamber 11 by conduit 37 which is directed at orifice 21 or at concentric port 54. In this operation, vaporizer 33 is not used but chamber 11 is heated. For example, acetylene or methane is passed from conduit 37 into chamber 11 through orifice 21. The heat of the chamber cracks the acetylene or methane into its products of carbon and hydrogen. The carbon deposits on the growing fibers and the hydrogen is burned for heat or is recirculated over the carbon as a buffer. Nitrogen and argon may also be used as a buffer.

Instead of controlling the nucleation in zone 19 by controlling the speed of reel 26 so that it withdraws fibers 23 at a rate which corresponds to the rate of growth of the fibers, the servomotor 25 may operate valve 38 to control the amount of vapor being introduced through conduit 37 into the chamber to be crystallized, or to control the amount of cool gas being introduced into zone 19 through conduit 37 to oppose the vapor being emitted from emitter 33.

Figure 3:
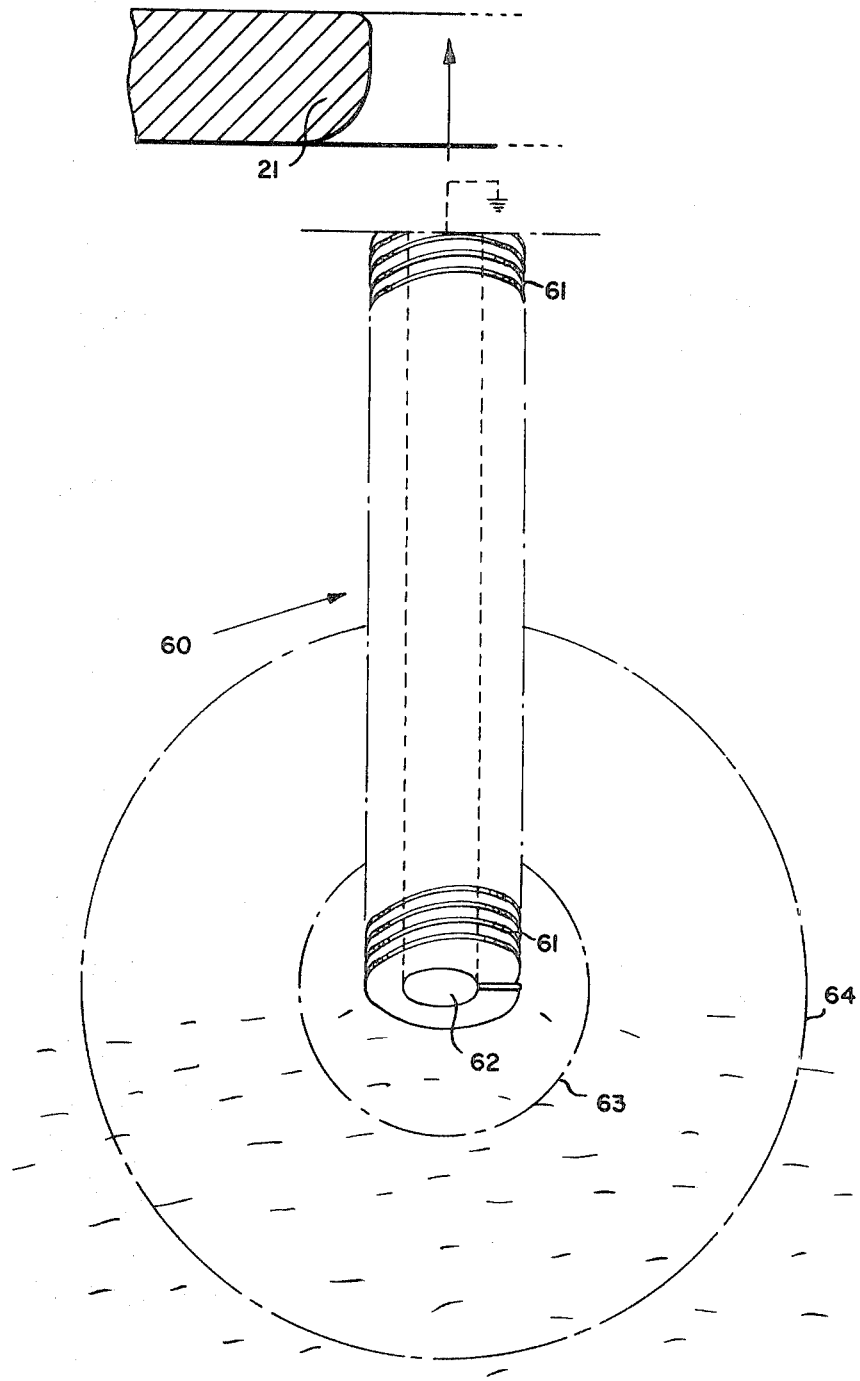
FIG. 3 is an enlarged diagrammatic view illustrating the manner in which a whisker grows.

FIG. 3 is useful in explaining what may be referred to as the screw dislocation theory of whisker growth. When a crystal grows, the molecules of the material to be crystallized have to find their way into the niches of the adjacent crystallized layer. The crystallized layer has a curb to which the molecules of the forming layer attach themselves so that the curb grows into another crystallized layer.

Each whisker 60 as illustrated in FIG. 3, has a screw formation similar to the construction of a spiral stairway around a post which may often be found in libraries. The growth of the spiral 61 does not stop but the diameter of the substrate 62 or core within the spiral does not get any larger.

It is surmised the spiral 61 is electrically conductive so that the electrostatic charge on the whisker 60 sets up a high electrical gradient 63 on ionized gas zone 64 on the end of whisker 60. Additionally, the electricaLly conductive spiral 61 forms the physical counterpart of mathematical sinks which promote growth.

The gas molecules in zone 64 are charged oppositely to the charge on whisker 60. In Fig. 3, the gas molecules are charged negatively and the whisker 60 is charged positively. Substrate 62 is connected to ground at orifice 21 to disperse the negative charge which would otherwise build up on the end of whisker 60 as the gas ions deposit on the end of the whisker during the growth process. If this negative charge on the end of the whisker were not dissipated, the gas ions would be repelled thereby and whisker growth would stop.

Electrical gradient 63 at the end of whisker 60 promotes growth of the whisker.

The whiskers of the present invention are of very high purity without contaminants such as the sulfur in graphite.

It is to be noted that the electrostatic charge on the whiskers serves two purposes: (1) it separates the ends of the whiskers in the growth zone so that each end is open to receive the material to be crystallized, and (2) it promotes the growth of the whiskers.

It is to be understood that the form of the invention herewith shown and described is to be taken as a presently preferred embodiment. Various changes may be made in the shape, size, and arrangement of parts. For example, equivalent elements may be substituted for those illustrated and described herein, parts may be reversed, and certain features of the invention may be utilized independently of the use of other features, all without departing from the spirit or scope of the invention as defined in the subjoined claims.

I claim:

1. In the method of making fibers by crystallization from vapor, the dispersal and separation of the nucleating fiber ends by the application of an electrostatic charge thereto.

2. A method of making fibers by crystallization from a vapor phase, comprising withdrawing the fibers through an orifice which constrains the fibers to a bundle with the nucleating ends of the fibers held divergent and spread out by electrostatically charging the fibers.

3. In a method of making fibers, the steps of creating a vapor of fiber-producing material, forming a plurality of growing elongated fibers by condensing fibrous crystals from the vapor and withdrawing the fibers from the chamber through an exit opening therein.

4. In a method of making fibers, the step comprising forming a plurality of growing elongated fibers by condensing fibrous crystals from a vapor state of fiber-producing material in a chamber, and electrostatically charging the fibers to fan out the ends of the fibers so that the ends are separated and individually exposed to vapor.

5. A method of making fibers comprising forming a plurality of growing elongated continuous fibers by condensing fibrous crystals from a vapor state of fiber-producing materials in a chamber, applying an electrostatic charge to the fibers to fan out their ends, and gathering the fibers together at a constricting position spaced away from the fiber ends.

6. A method of making fibers comprising forming a plurality of growing elongated fibers by condensing fibrous crystals from a vapor stage of fiber-producing material in a chamber, measuring the rate of growth of the fibers by applying an alternating electric potential superimposed on a static charge to the growing fibers and measuring the capacity to ground, and controlling the rate of condensing by means which are operated in response to the value of capacitance of the fibers.

7. In a method of making fibers, the steps comprising forming a plurality of growing elongated fibers by condensing fibrous crystals from a vapor stage of fiber-producing material in a chamber, and applying an electric potential to the fibers so as to obtain a potential difference between the growing fibers and the chamber.

8. The method according to claim 7 including the step of measuring the rate of growth of the fibers by measuring the capacitance to ground of the growing cluster.

9. The method according to claim 7 including the step of withdrawing the fibers from the chamber through an exit opening therein by means of a servo-operated reel which is actuated in response to the value of electric capacitance of the fibers.

10. In a method of making fibers, the steps comprising forming a plurality of growing elongated fibers by condensing fibrous crystals from a vapor stage of fiber-producing material in a chamber, applying an electric potential to the fibers so as to obtain a potential difference between the growing fibers and the chamber, and withdrawing the fibers from the chamber through an exit opening therein by means of a servo-operated reel which is actuated in response to the rate of growth of the fibers.